United States Patent [19]

Hohda et al.

[11] 4,174,165
[45] Nov. 13, 1979

[54] POWER SUPPLY CONTROL DEVICE FOR CAMERAS

[75] Inventors: Takeo Hohda; Shinji Tominaga, both of Sakai; Yoshiharu Ohta, Izumi, all of Japan

[73] Assignee: Minolta Camera Kabushiki Kaisha, Osaka, Japan

[21] Appl. No.: 897,841

[22] Filed: Apr. 19, 1978

[30] Foreign Application Priority Data

Apr. 29, 1977 [JP] Japan .................................. 52-50513

[51] Int. Cl.² ........................ G03B 17/24; G03B 15/05
[52] U.S. Cl. .................................... 354/105; 354/145
[58] Field of Search .................................. 354/32–34, 354/60 R, 60 F, 105, 106, 109, 129, 135, 139, 149, 126–128, 145; 346/107 UP; 352/90, 93

[56] References Cited

U.S. PATENT DOCUMENTS

| 3,813,679 | 5/1974  | Hasegawa et al. | 354/33 X |
| 3,842,428 | 10/1974 | Kawasaki        | 354/33 X |
| 3,849,784 | 11/1974 | Holzapfel       | 354/109 X |
| 3,886,443 | 5/1975  | Miyakawa et al. | 354/60 X |
| 3,906,523 | 9/1975  | Ogiso et al.    | 354/109 |
| 4,025,931 | 5/1977  | Taguchi et al.  | 354/105 |
| 4,062,027 | 12/1977 | Miyazaki et al. | 354/60 F X |
| 4,067,030 | 1/1978  | Kuramoto et al. | 354/139 |

Primary Examiner—L. T. Hix
Assistant Examiner—William B. Perkey
Attorney, Agent, or Firm—Watson, Cole, Grindle & Watson

[57] ABSTRACT

In a camera provided with a data or auxiliary information recording device and an electronic flash device for illuminating an object scene to be photographed, another electronic flash device is provided for the illumination of data to be recorded. A single power source is used for both the above two electronic flash devices and an automatic exposure control circuit. To avoid a voltage drop of the power source during the operation of the exposure control circuit due to charging of the main capacitor for the electronic flash for the scene illumination, a power supply switch for the main capacitor charging circuit is manually closed independently of the camera exposure operation. A capacitor for energizing the electronic flash for the data illumination is charged in conjunction with the camera release operation before the camera exposure is commenced.

10 Claims, 3 Drawing Figures

POWER SUPPLY CONTROL DEVICE FOR CAMERAS

BACKGROUND OF THE INVENTION

1. Field of the Invention

The present invention relates to a power supply control device for a camera, and more particularly pertains to a power supply control circuit for a camera provided with two electronic flash devices. One flash device is for the illumination of a scene to be photographed and the other is for the illumination of data to be recorded, with both electronic flash devices being supplied with electric energy from a common power source.

2. Description of the Prior Art

Devices are well known which, upon exposure of a film to photograph an object scene, records auxiliary information on the film, such as numerals for identifying the photography, or the exposure conditions used for taking the picture, or other data relating to the picture being taken. It has been common for such information recording devices, or data recording or imprinting devices, that an illuminating lamp such as a tungsten lamp is lit for a given time interval in conjunction with the picture taking operation of the camera, in order to project an image of the information to be recorded on the film. Such a tungsten lamp should be lit for a duration of approximately 0.5 seconds. It has been customary to actuate a monostable multivibrator in response to an exposure termination signal from an exposure time control circuit to light the lamp for the given duration of time. During the time the lamp is maintained lit, an electric power source must be connected to the circuit for lighting the lamp. In the case where a switch for the power supply is adapted to open and close in conjunction with the movement of a shutter release button, some measure has to be taken such that the current supply to the lamp is maintained for a duration of time, even if the shutter release button is released to assume its initial position immediately after it has been operated.

Cameras are known, in which an electronic flash device is incorporated and a power source for the electronic flash is also used in common for the data recording lamp. With such a camera, immediately after the electronic flash lamp is fired, a main capacitor for storing energy for energizing the flash lamp beings to be recharged which greatly decreases the voltage of the source battery from its normal level, resulting in failure to energize and light the data recording lamp for the duration of time required. To avoid this, one of the prior art power supply control circuits for the electronic flash and the data recording lamp, was arranged to temporarily interrupt the operation of the oscillator circuit for producing high voltage to be applied to the main capacitor for the duration that the data recording lamp was being lit.

SUMMARY OF THE INVENTION

It is the primary object of the present invention to provide an improved power supply control device for a camera of the type wherein a common power source is used for both a data recording lamp and an electronic flash tube.

It is another object of the present invention to provide a power supply control device of the type specified which requires no means for maintaining the current supply to the recording lamp and for interrupting the operation of the oscillator circuit of the flash device for a time while the data recording is being effected, thereby simplifying the construction of the control device.

To attain the above objects, the power supply control device according to the present invention comprises a first electronic flash tube for illuminating a scene to be photographed, a first capacitor for energizing the first electronic flash tube, a second electronic flash device for illuminating data to be recorded on the film along with the picture being taken, and a second capacitor for energizing the second electronic flash tube. A voltage converter generates high voltages at the output thereof and the first and second capacitors are parallelly connected to the voltage converter. A first switch means manually operable independently of the camera exposure operation enables charging of the first capacitor by the output voltage of the voltage converter. A second switch means, operable in relation with the camera release operation, charges the second capacitor from another output voltage of the voltage converter.

According to one aspect of the preferred embodiment of the present invention, at least the first electronic flash tube is triggered in response to the commencement of a shutter closing operation, so that the automatic exposure control circuit is not affected by the charging operation of the first capacitor, because the substantial operation of the automatic exposure control circuit has been finished at that time. It is to be noted here that, if the automatic exposure control circuit is of the type to control exposure time, its main function is to generate a signal for initiating shutter closure. If the automatic exposure control circuit is of the type for controlling the diaphragm aperture, the control operation must be completed before the shutter is released.

According to another aspect of the preferred embodiment of the present invention, the second switch means is actuated at the first stage of shutter button depressing operation, so that the second capacitor is charged up before the actuation of the camera shutter is effected at the terminal stage of the shutter button depressing operation.

The above and other objects and features of the invention will appear more fully hereinafter from a consideration of the following description taken in connection with the accompanying drawings. It is to be expressly understood, however, that the drawings are for the purpose of illustration only and are not intended as a definition of the limits of the invention.

DESCRIPTION OF PREFERRED EMBODIMENTS

Figure 1:
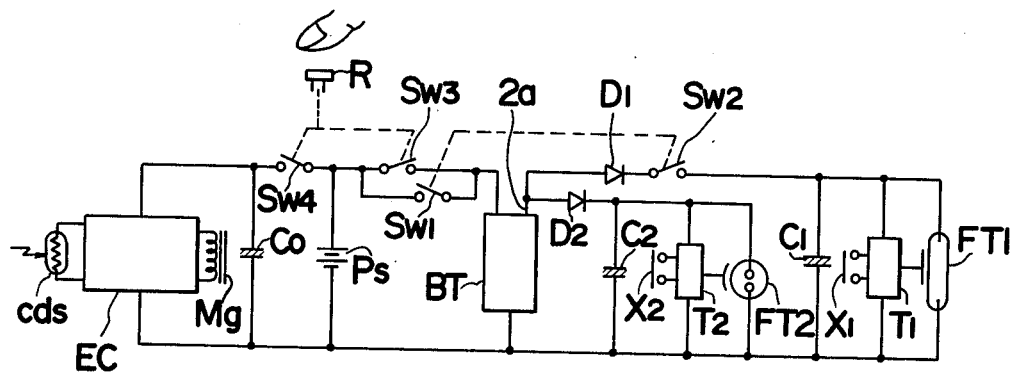
FIG. 1 is a schematic circuit diagram showing an electric circuit according to one embodiment of the present invention.

Referring first to FIG. 1, exposure time control circuit EC, known per se, is adapted to automatically control the exposure time by actuating electromagnet Mg commensurate with the output of photoconductive element CdS, when the object brightness is higher than a given value (for example, a blur occurring limit), and to provide a shutter speed suitable for flash photography, in case the object brightness is lower than the given value. The exposure time control circuit may have the constitution as disclosed in U.S. Pat. No. 3,667,357. That is, the exposure control circuit includes a light responsive delay circuit developing a delay time commensurate with a light representative output and a fixed time delay circuit for providing a given low shutter speed within a range such that the photograph will not be blurred. The delay circuits are connected in parallel with one another to a control pole of a semiconductor switching circuit for controlling the energization of an electromagnet for the initiation of shutter closing. Furthermore, one of the delay circuits which generates the output earlier than the other, controls the exposure time and the flash lamp is triggered by a switching element responsive to the difference in the output levels of the two delay circuits. As an alternative, a semiconductor switching circuit may be provided which is to be controlled by an output from a light measuring circuit, such as a voltage divider consisting of a photoconductive element and a fixed resistor connected in series with each other, or a circuit including a resistor which is supplied with a photoelectric current or an equivalent current to provide a light representative voltage. Thus, when the object brightness has such a value that will cause a blur at the required shutter speed, the output of the switching circuit may change over the condition of the exposure control circuit to provide a shutter speed adapted to flash photography and makes the flash firing circuit operative.

A power source battery PS may consist of, for example, two alkaline-manganese or manganese dry cells connected in series with each other to provide 3 V DC voltage. Switches SW1 and SW2 are interconnected with one another to be closed by a voluntary manual operation independently of the camera exposure operation. Switches SW3 and SW4 are associated with shutter release button R to be respectively closed at the first stage of the depression of the shutter release button. Voltage smoothing capacitor Co is disposed between power source PS and automatic exposure control circuit EC.

An oscillator or booster circuit BT, for providing a high voltage for energization of the flash lamps includes, as is well known, an oscillation transistor and an oscillation-boosting transformer, and forms a DC-DC converter together with diodes D1 and D2 connected to the output thereof. First capacitor C1 stores electric energy for energizing and firing first flash lamp FT1. A trigger circuit T1 triggers the firing of first flash lamp FT1 upon closure of trigger switch X1. Second capacitor C2 stores therein an electric energy for energizing and firing second flash lamp FT2 for illuminating a data bearing member (not shown) so that a data bearing light is projected onto the film. Trigger circuit T2 triggers second flash lamp FT2 upon closure of trigger switch X2.

Figure 2:
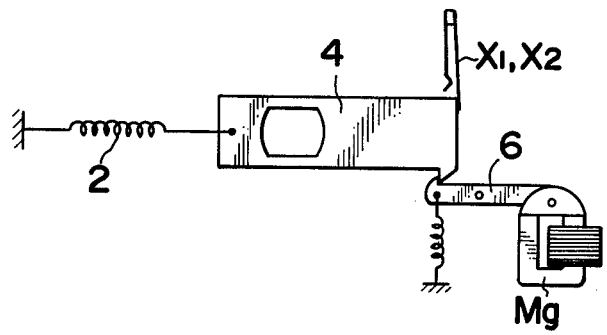
FIG. 2 is an explanatory view of a trigger switch operating mechanism.

Referring to FIG. 2, the two trigger switches X1 and X2 are adapted to be closed when shutter member 4, which is biased to the left by spring 2, is released from engagement with locking lever 6 and moved to the left. Locking lever 6 has armature 6a pivotally mounted thereon and locks and releases shutter member 4 under the control of electromagnet Mg connected to the output of exposure time control circuit EC, shown in FIG. 1.

First capacitor C1 may have a capacity of the order of 200 $\mu$F, and second capacitor C2 has a capacity as low as 1 $\mu$F so that its charging time may be short enough. Second flash lamp FT2 is used only for illuminating the data to be imprinted or recorded, and a smaller size lamp, as compared with the first flash lamp, may be used.

The operation of the circuitry is such that when shutter release button R is depressed for ordinary photography, with switches SW1 and SW2 maintained open, switches SW3 and SW4 are closed, whereby current is supplied to exposure time control circuit EC as well as to oscillator circuit BT to charge second capacitor C2. The duration of time necessary for charging capacitor C2 to a level high enough to fire the second flash lamp FT2 is within 0.1 second where the oscillator circuit is of the type such as used in an ordinary electronic flash device. The photographer may be notified of the operation of the oscillator BT by a sound produced by oscillator circuit BT, at the first stage of the depression of the shutter button. If the shutter button is further depressed, then the shutter is released, and exposure is commenced. After a lapse of a given time commensurate with object brightness, electromagnet Mg is deenergized (or energized as the case may be), whereas locking lever 6 is rotated counterclockwise to thereby allow the shutter closing member to move for the termination of exposure. Upon release of the shutter closing member, second trigger switch X2 is closed, whereby second capacitor C2 is discharged by way of second flash lamp FT2 to fire the lamp, and the data are thus recorded photographically. Since the duration of the firing of second flash lamp FT2 is as little as the order of 1 mm second, there will be no likelihood of the data being blurred due to the movement of the film even if the film-winding operation is started immediately after the termination of exposure. The data may be recorded without failure, even if the shutter button is released to open switches SW3 and SW4 immediately after the termination of the exposure.

When second power source switch SW3 is closed at the first stage of depression of shutter button R, an inter-terminal voltage of source battery E is decreased to a level as low as half the electromotive force thereof due to the power supply to osciliator circuit BT. However, after a lapse of very short time, in the order of 0.1 second, such a large voltage drop ceases and the power source voltage restores, so that the succeeding exposure operation is not affected by the voltage drop. Pulsation arises in the interterminal voltage at source battery E due to the intermittent power supply of the battery caused by the switching operation of the oscillation-transistor included in oscillation circuit BT. Such pulsation is, however, smoothened by capacitor Co for the stabilized operation of exposure control circuit EC.

The following is an explanation of the operation for flash photography. If switches SW1 and SW2 are closed manually by the photographer, then the charging of first capacitor C1 starts, and when that capacitor voltage reaches a given level, the completion of the charging is indicated by a known discharge lamp, such as a neon lamp (not shown). In this case, second capacitor C2 is also charged simultaneously. If the shutter button is depressed to release the shutter, exposure time control circuit EC actuates electromagnet Mg after the lapse of a given duration of time, so that shutter closing member 4 is released from engagement with locking lever 6, to thereby start the shutter closing operation.

At the initial stage of the shutter closing operation by the shutter closing member, i.e. in the condition where the shutter is open, trigger switch X1 is closed, to fire flash lamp FT1, which in turn illuminates the object or object scene to be photographed. Since the duration of illumination by the first flash lamp FT1 is in the order of 1 mm second, if first flash lamp FT1 is fired at the beginning of the shutter closing motion of the shutter closing member, the flashing is completed while the shutter remains open. Simultaneously with the closure of trigger switch X1, trigger switch X2 is also closed to fire second flash lamp FT2, whereby data is recorded.

In the arrangement so far described, trigger switches X1 and X2 may be of the non-contact type consisting of semiconductor switches such as thyristors (SCRs), rather than contact switches as illustrated in the Figures. In this case, it is recommended that the semiconductor switches, such as thyristors be made conductive by the output signals from exposure controlling circuit EC.

Figure 3:
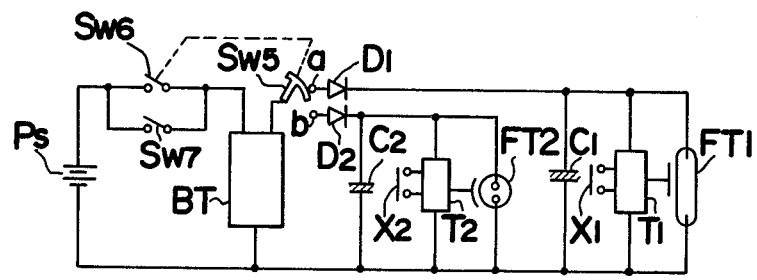
FIG. 3 is a block diagram of an electric circuit according to another embodiment of the present invention.

FIG. 3 is a block diagram of a flash firing circuit according to another embodiment of the present invention. Elements equivalent to or corresponding to those of the first embodiment shown in FIG. 1 are identified with like reference numerals, and no further description of such elements is given. In this embodiment, selection switch SW5 is provided for selective connection of oscillator circuit BT in three ways, that is at first connecting the circuit to first capacitor C1 alone (the first mode), to second capacitor C2 alone (the second mode) and to both of first and second capacitors simultaneously (the third mode). Switch SW6 is interlocked with selection switch SW5 to be turned on in the first and third modes, and to be turned off in the second mode. Switch SW7, connected in parallel with switch SW6, is adapted to be closed in the first stage of the depression of the shutter release button, like the switches SW3 and SW4 in FIG. 1.

The operation is such that if the movable contact of selection switch SW5 is brought into contact with fixed terminal a alone (the operation in the 1st mode), switch SW6 is in an On-position, whereby oscillator circuit BT operates, prior to the photography, to charge the first capacitor. After having confirmed the termination of charging of the first capacitor according to the indication of a neon lamp (not shown), the photographer initiates shutter release operation so that flash photography is accomplished. If the movable contacts of selection switch SW5 are brought into contact with both of fixed terminals a and b (the operation in the second mode), then a current is supplied to oscillator circuit BT through switch SWt, which has been turned on, to charge first and second capacitors prior to the photography. Then, if the operator initiates shutter release operation, flash photography is carried out with the data being recorded.

If the movable contact of selection switch SW5 is connected to fixed contact b alone, (the third mode) switch SW6 is moved into an off-position, whereas oscillator circuit BT remains inoperative until the picture-taking operation is effected. As a result of the shutter release operation, switch SW7 is closed, and oscillator circuit BT is operated, so that second capacitor C2 alone is charged within a short duration of time prior to film exposure, and the data is recorded in association with the shutter closing operation.

Throughout the first and second embodiments shown in FIGS. 1 and 3, if another manually operable switch is provided in trigger circuit T2 for second flash lamp FT2, and that switch is moved to an off-position, so as not to trigger second flash lamp FT2, then the printing of data is not effected, in the case of ordinary photography, in which no flash lamp is required.

What is claimed is:

1. In a photographic system which includes means for effecting an exposure operation of a camera, means for initiating the exposure operation, a first electronic flash means for illuminating a scene to be photographed and means for recording auxiliary data on a film, the recording means having a second electronic flash means for illuminating the data to be recorded, a power supply control device comprising:
   a first capacitor for energizing said first electronic flash means;
   a second capacitor for energizing said second electronic flash means;
   a voltage converter means for generating a voltage at an output terminal, said first and second capacitors being connected to said output terminal;
   a first switch means manually operable independently of the camera exposure initiating means for permitting said first capacitor to be charged with the output voltage of said voltage converter; and
   a second switch means operable by said initiating means for permitting said second capacitor to be charged with the output voltage of said voltage converter.

2. A power supply control device as in claim 1 further comprising a power source battery, and wherein said first switch means includes a first switch member disposed between said first capacitor and said voltage converter, and a second switch member disposed between said voltage converter and said power source battery, and said second switch means includes a third switch member connected in parallel with said second switch member.

3. A power supply control circuit as in claim 2 wherein said first and second switch members respectively include first and second mechanical contact switches interlocked with one another to be opened and closed simultaneously.

4. A power supply control device as in claim 2 wherein said first switch member includes a selector switch selectively settable to a first position for connecting only said first capacitor with said voltage converter, to a second position for connecting both said first and second capacitors with said voltage converter and to a third position for connecting only said second capacitor with said voltage converter, said second switch member being interlocked with said selector switch to be opened with said selector switch at said third position.

5. A power supply control device as in claim 1 wherein said second switch means includes a selector switch for selectively connecting either one or both of said first and second capacitors.

6. A power supply control device as in claim 5 further comprising a power source battery and a manual mechanical switch interposed between said power source battery and said voltage converter means and interlocked with said selector switch to be closed with said selector switch selecting said first capacitor.

7. A power supply control device as in claim 1, further comprising a first trigger switch means for triggering said first electronic flash means, a second trigger switch means for triggering said second electronic flash means, and a switch operating means for actuating said first and second trigger switch means in response to the commencement of a shutter closing operation.

8. A power supply control device as in claim 1, further comprising a first trigger switch means for triggering said first electronic flash means and a second trigger switch means for triggering said second electronic flash means, and wherein said camera further includes a shutter closing member and means for actuating said shutter closing member, said first and second trigger switch means being interlocked with said shutter closing member to be operated upon actuation of said shutter closing member.

9. A power supply control device as in claim 1 wherein said camera further includes an electric exposure control circuit, a power source battery connectable with said exposure control circuit and said voltage converter means, and a smoothing circuit member disposed between said power source battery and said exposure control circuit.

10. A power supply control device as in claim 9 wherein said second switch means is disposed between said voltage converter and said power source battery, and said first switch means includes means for selectively connecting said first capacitor with said voltage converter.

* * * * *